(No Model.)
E. WEBSTER.
MOWING AND REAPING MACHINE.
No. 450,546. Patented Apr. 14, 1891.
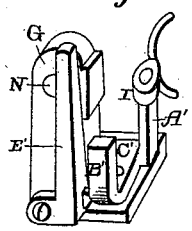
Fig. 4.
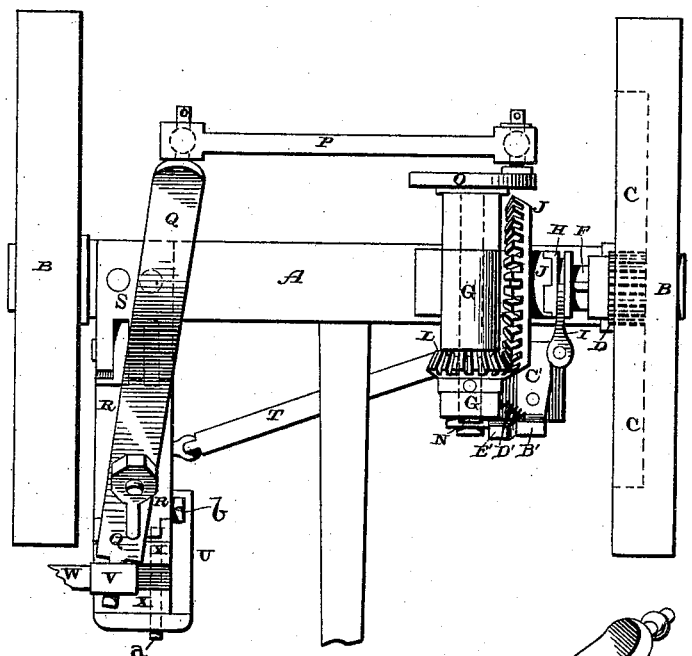
Fig. 1.
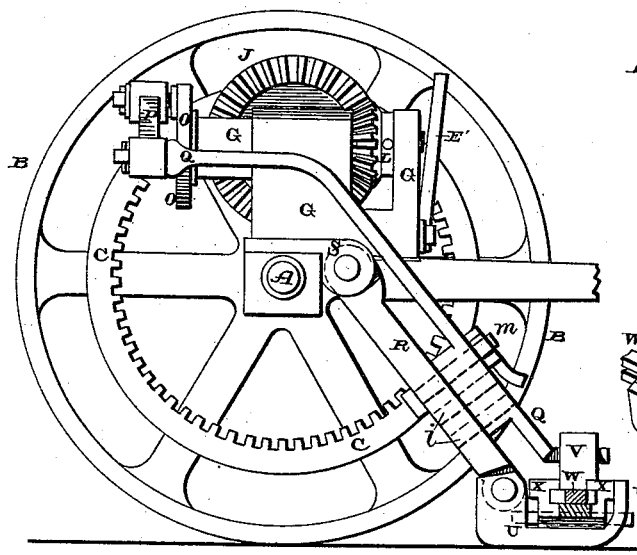
Fig. 2.
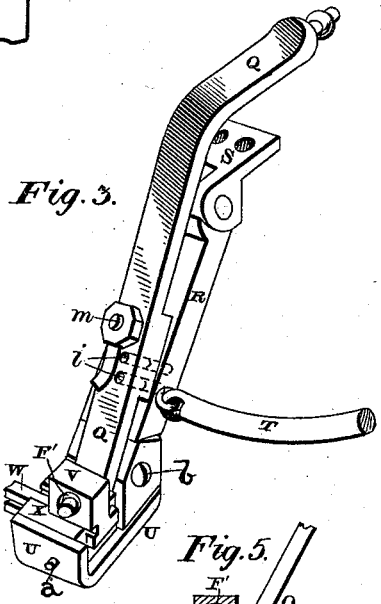
Fig. 3.
Fig. 5.
Witnesses:
E. A. Ellis
J. M. Nesbit
Inventor:
Edson Webster,
per
J. A. Lehmann, atty

UNITED STATES PATENT OFFICE.

EDSON WEBSTER, OF CANNONSVILLE, NEW YORK.

MOWING AND REAPING MACHINE.

SPECIFICATION forming part of Letters Patent No. 450,546, dated April 14, 1891.

Application filed June 25, 1890. Serial No. 356,700. (No model.)

*To all whom it may concern:*

Be it known that I, EDSON WEBSTER, of Cannonsville, in the county of Delaware and State of New York, have invented certain new and useful Improvements in Reaping and Mowing Machines; and I do hereby declare the following to be a full, clear, and exact description of the invention, such as will enable others skilled in the art to which it pertains to make and use it, reference being had to the accompanying drawings, which form part of this specification.

My invention relates to an improvement in reaping and mowing machines; and it consists in the combination and arrangement of parts, which will be fully described hereinafter.

The object of my invention is to operate the cutter by a long lever, so as to obtain as much leverage as possible, and to produce a cheap, strong, and more durable operating apparatus for operating the cutter than has heretofore been used.

Figure 1 is a plan view of an apparatus which embodies my invention. Fig. 2 is a side elevation of the same, taken from the grain side. Fig. 3 is a detail view of the shoe and its attachments. Fig. 4 is a detached perspective of the mechanism for operating the clutch. Fig. 5 is a detail sectional view through the cutter-bar head.

A represents the axle, and B the two driving-wheels. One of these wheels is provided with internal teeth or gears C, which mesh with the pinion D, placed upon the short shaft F and journaled in the bearing G upon the top of the axle A. This shaft F is provided with a feather, and upon it is placed a clutch H, which is operated by the arm I, which is secured to the upper end of the vertical post A', the lower end of which is secured to the lever C'. This lever C' is pivoted upon the supporting-base, as shown, so as to oscillate horizontally. Extending upward from the opposite end of this lever is a projection B', with which the lower end of the cam-lever E' engages, and by means of this lever the clutch H is thrown in engagement with the wheel J and held there until the lever is lowered to a horizontal position. When the lever is lowered, the clutch is disengaged from the wheel J by means of the contracting spring D'; or it may be removed by hand.

Placed loosely upon the shaft F and locked thereto by the clutch H is a large bevel-gear J, which meshes with the pinion L, upon a short shaft N, which extends at right angles to the axle and is journaled in the bearing G.

Secured to the rear end of the shaft N is the pitman-wheel O, and connected to this pitman-wheel is the pitman P. A ball-and-socket joint is preferably used between the wheel O and pitman P for the purpose of allowing the parts a free universal movement and preventing any unnecessary binding between the parts while in operation. The outer end of the pitman P is connected by a ball-and-socket joint with the rear end of the pivoted lever Q, which is pivoted upon the pivoted thrust-bar R, which is loosely connected at its upper end to the casting S, which is secured to the axle. This pivoted thrust-bar R is braced in position, so as to prevent any lateral movement by the brace T, which has its upper end connected loosely to the axle A. This thrust-bar R can be raised and lowered for the purpose of enabling the shoe U, secured to its lower end, to freely pass over obstructions of all kinds, the shoe being pivoted to the thrust-bar R, so as to turn freely upward at its front end. Pivoted in this shoe U is the inner end of the finger-bar and which is grooved so as to receive the head V of the cutter W. The inner end X of the finger-bar is placed in the recess in the top of the shoe, and is pivoted at its inner end at the point *a*, so that it can be turned upward independently of the shoe U, and thus enable the cutter-bar to be operated at any desired angle. The joint between the lever Q and the head V of the cutter W is a ball and socket, so that the parts will operate with the least possible amount of friction no matter in what position they may be placed. The lever Q, as will be seen, is of considerable length and a very powerful stroke is communicated to the cutter-bar while the machine is in motion. The lower end of the lever Q passes through a ball F', which is placed in the head V, so that when the shoe U is turned upon its pivotal point *b* the end of the said lever moves through the ball.

The parts are few, cheap, and simple, and are not liable to get out of order.

For the purpose of giving the cutter-bar more power, and thus adapting the machine for thick or stubby grain or grass, the lever Q and the pivoted thrust-bar R will be provided with a corresponding series of apertures $i$ for the passage of their pivotal bolt M. By placing the pivotal bolt that passes through the lever Q near its lower end, the cutter-bar will have greater power.

Having thus described my invention, I claim—

1. In a mowing-machine, the combination of the frame, a thrust-bar loosely connected at its upper end to the frame, a shoe connected to the lower end of the thrust-bar, a finger-bar head connected to the shoe, a cutter-bar head sliding in the finger-bar head, a ball within the cutter-bar head having an opening transverse the cutter-bar, a lever pivoted between its ends upon the thrust-bar and having its lower end passed loosely through the opening in the said ball, whereby the thrust-bar can be raised, and an operating mechanism connected with the upper end of the lever, combined in the manner and for the pupose described.

2. In a mowing-machine, the combination of the frame, a thrust-bar loosely connected at its upper end thereto, a shoe transversely pivoted to the lower end of the said bar, a finger-bar head pivoted at its inner end within the said shoe, a cutter-bar head sliding within the finger-bar head, a lever pivoted between its ends to the said thrust-bar, the lower end of the said lever passing loosely and transversely through the cutter-bar head, and an operating mechanism connected to the upper end of the said lever, substantially as specified.

3. In a mowing-machine, the combination of the frame, a thrust-bar loosely connected at its upper end to the frame, a shoe transversely pivoted to the lower end of the said bar, a finger-bar head transversely pivoted in the shoe, a cutter-bar head sliding in the finger-bar head, a lever pivotally connected between its ends to the thrust-bar, its lower end adapted to engage the cutter-bar head, and a brace loosely connected at its ends to the thrust-bar and the frame, whereby the thrust-bar can be raised at its outer end, substantially as set forth.

In testimony whereof I affix my signature in presence of two witnesses.

EDSON WEBSTER.

Witnesses:
   FRED W. CRAWFORD,
   GEORGE B. CRAWFORD.